May 20, 1941.  H. F. FLOWERS  2,242,852
TANDEM WHEEL TRUCK STRUCTURE
Filed May 20, 1939  4 Sheets-Sheet 2
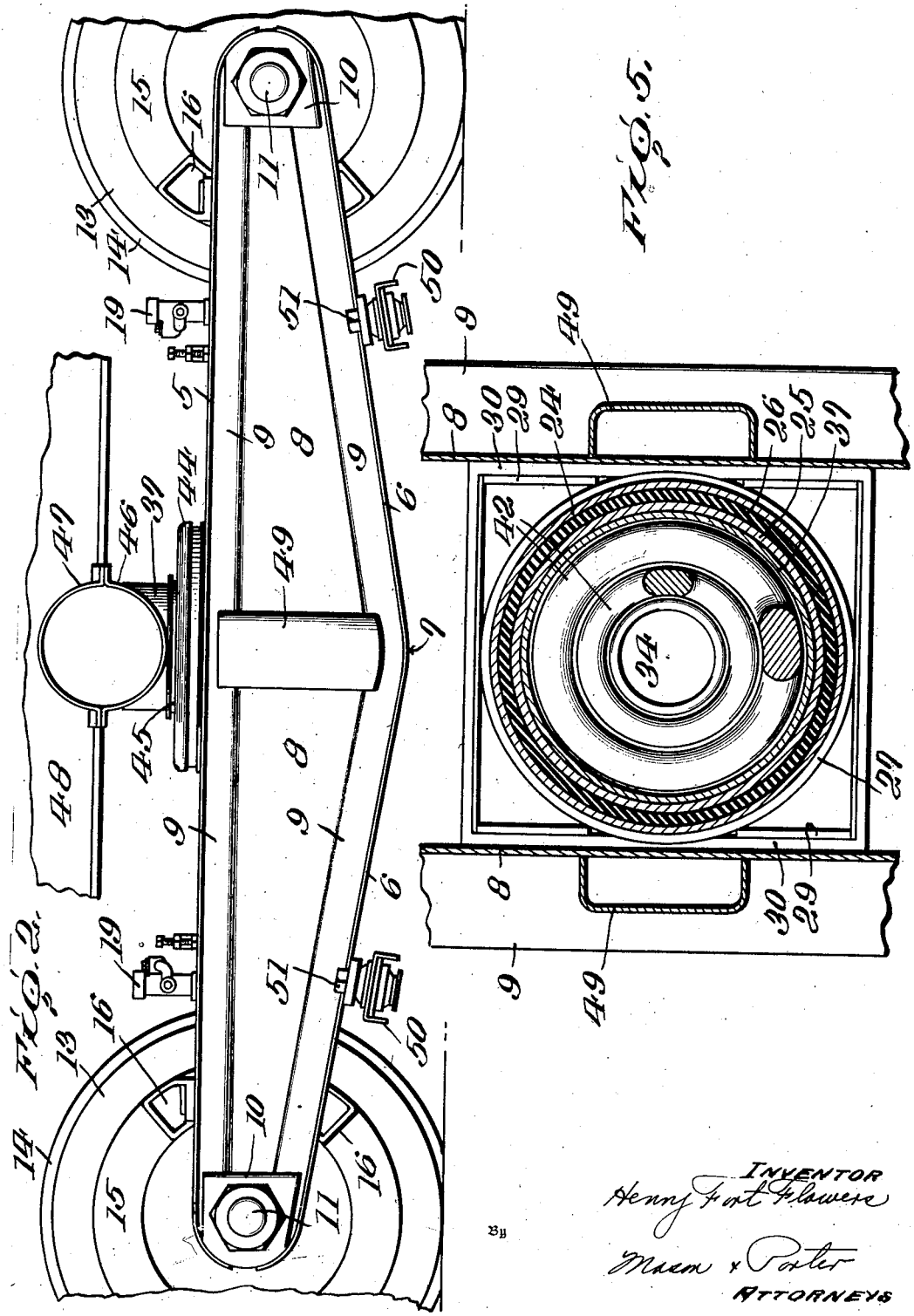
INVENTOR
Henry Fort Flowers
By
Marm & Porter
ATTORNEYS

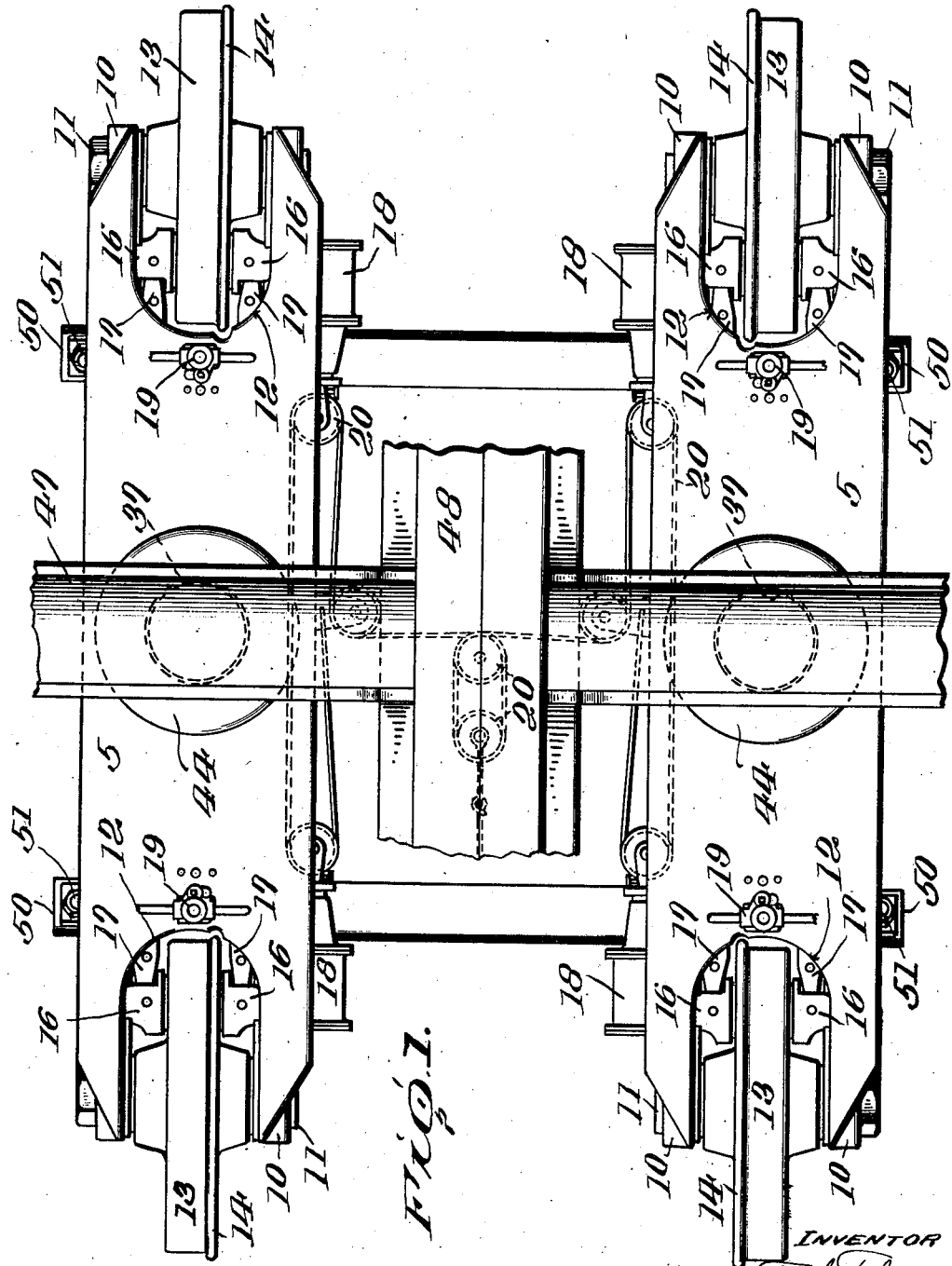

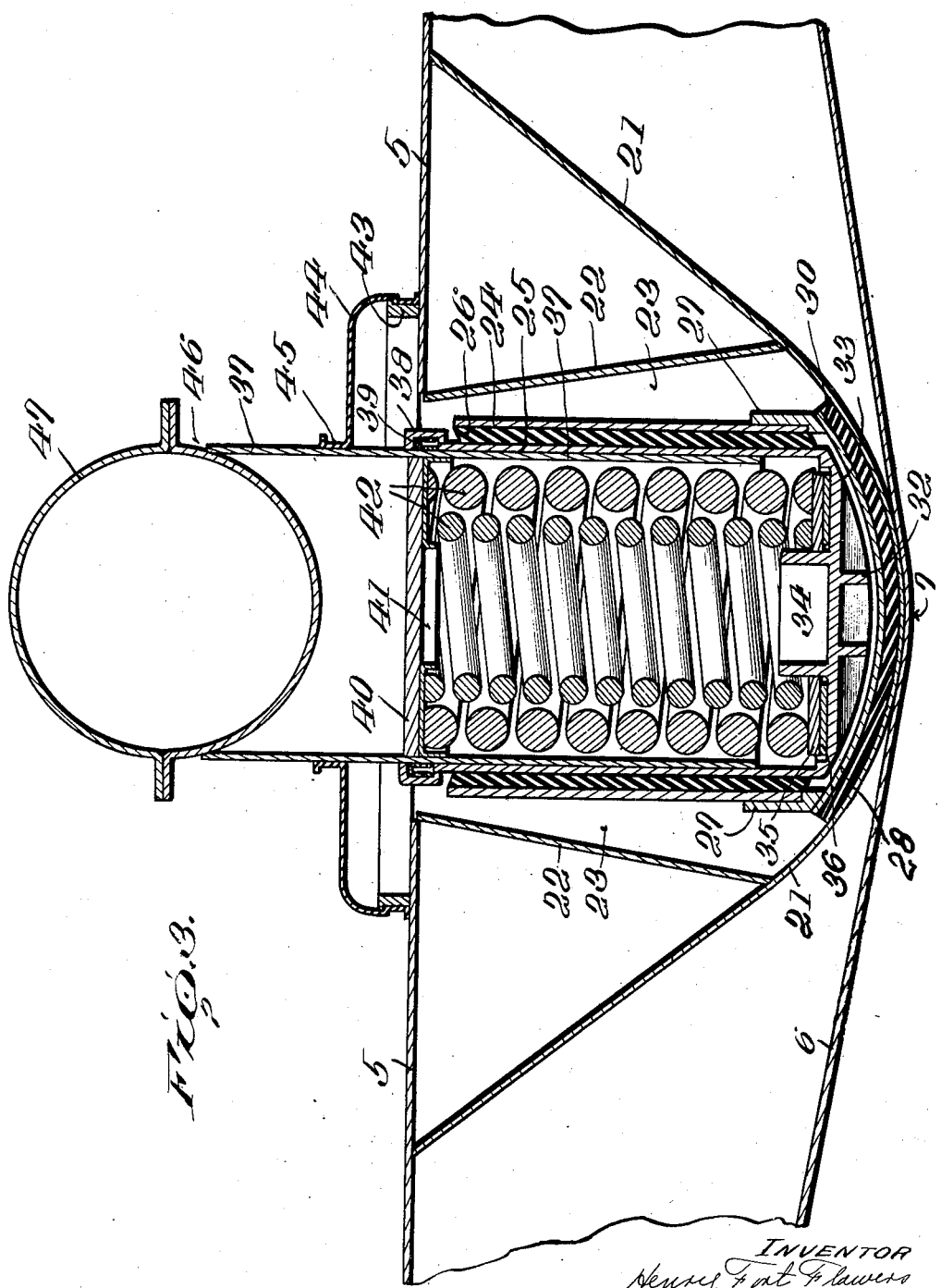

May 20, 1941.  H. F. FLOWERS  2,242,852
TANDEM WHEEL TRUCK STRUCTURE
Filed May 20, 1939   4 Sheets-Sheet 4
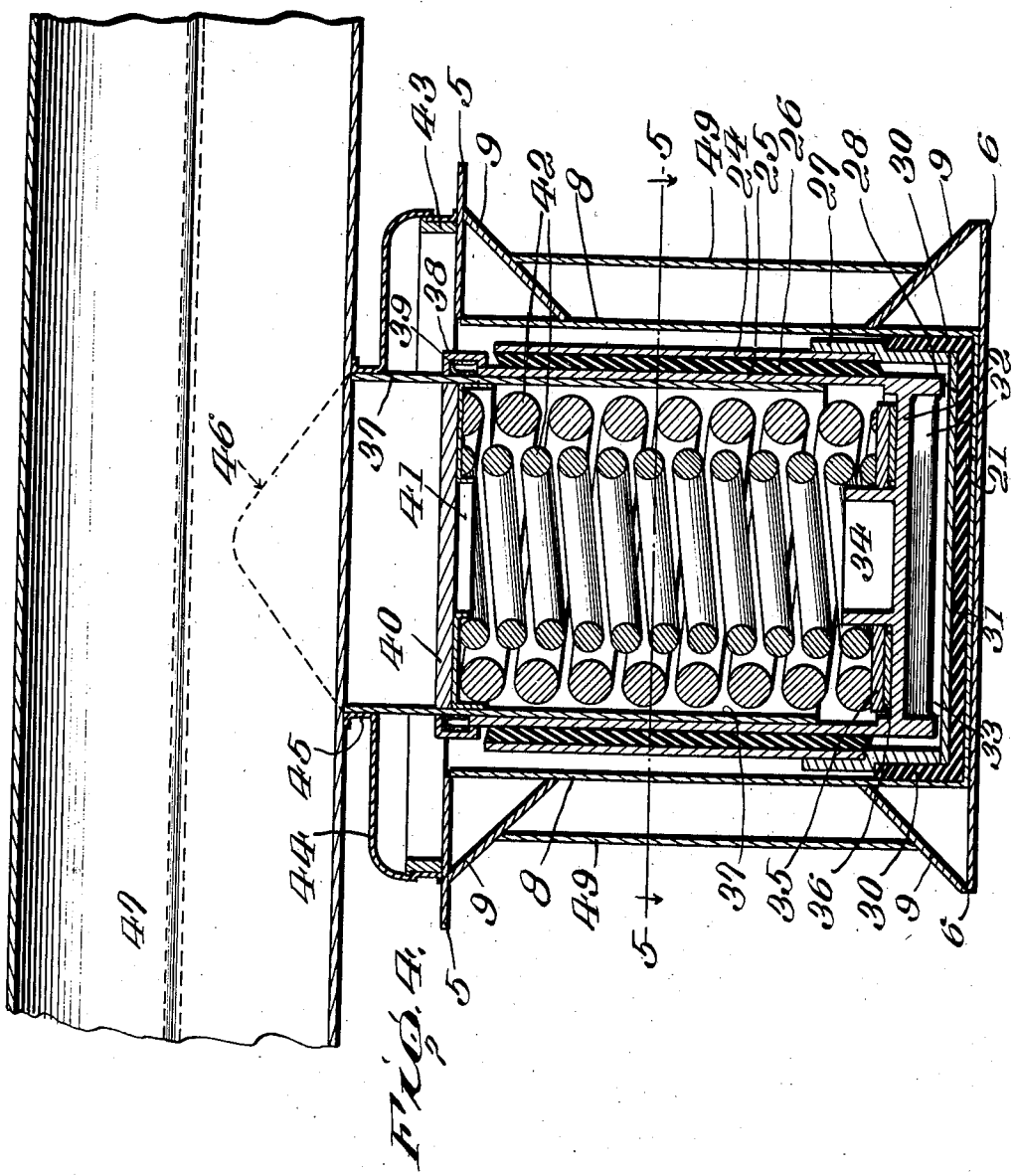
INVENTOR
Henry Foat Flowers
Mason & Porter
ATTORNEYS Patented May 20, 1941

2,242,852

UNITED STATES PATENT OFFICE 2,242,852

TANDEM WHEEL TRUCK STRUCTURE

Henry Fort Flowers, Findlay, Ohio

Application May 20, 1939, Serial No. 274,847

8 Claims. (Cl. 105—179)

The invention relates to certain new and useful improvements in tandem wheel truck structures of the types disclosed in United States Letters Patents 2,063,545 and 2,078,915 issued on December 8, 1936, and April 27, 1937, respectively, to Henry Fort Flowers, and primarily has for an object to provide a novel king post receiving gimbal structure.

In truck structures of the type stated, the king posts upon which the car or vehicle body is supported are oscillatably and vertically-reciprocably received in gimbal structures, each truck element or unit which is equipped with a pair of supporting wheels arranged in tandem relation being provided with such a gimbal structure and individually mounted on one of said king posts. The truck elements or units are thus made individually movable on their king post mountings and it is desirable that each truck element should be capable of a slight amount of substantially universal movement so that it can adapt itself to travel over the various qualities of roadbeds encountered, and also that means be provided for preventing metal to metal contacts likely to cause violent shocks, chattering and noise during such travel.

Therefore, the invention has for an object to provide novel gimbal structures including telescopic concentrically spaced sleeve elements having shock absorbing, relative movement permitting material therebetween.

Another object of the invention is to provide gimbal structures of the character mentioned in which the shock absorbing, relative movement permitting material is in the form of a rubber sleeve which is vulcanized to the cooperating sleeve elements so as to yieldably resist relative longitudinal and lateral movements of said sleeve elements.

Another object of the invention is to provide gimbal structures of the character mentioned in which the rubber sleeve is supplemented by coil spring load supporting equipments.

Another object of the invention is to provide gimbal structures of the character mentioned in which the rubber sleeve is supplemented by additional rubber pad inserts between the outer gimbal sleeve and the truck element frame at bottom and sides for the purpose of additionally absorbing shock and yielding to movements of the truck element laterally and in a longitudinal rocking direction about a transverse axis.

With the above and other objects in view that will hereinafter appear, the nature of the invention will be more clearly understood by following the detailed description, the appended claims, and the several views illustrated in the accompanying drawings, in which:

Figure 1 is a plan view illustrating a pair of connected truck elements or units embodying the invention.

Figure 2 is a side elevation of the parts shown in Figure 1.

Figures 3 and 4 are enlarged vertical sections respectively taken longitudinally and transversely through the axis of a gimbal structure.

Figure 5 is a horizontal section taken on the line 5—5 in Figure 4.

In the practical development of the invention, each truck unit or element preferably is fabricated from steel plating suitably welded together. In the example of embodiment herein disclosed, each truck element includes horizontally disposed upper plating 5 and opposed lower plating 6 spaced from the upper plating and having a lower central point 7 and converging upwardly in the fore and aft direction toward said upper plating. The sides of each truck element are closed by a suitably spaced side plating 8, and the side and top and bottom plating is suitably reinforced by angle plates 9 welded to said plating.

Bearing boxes 10 are secured in spaced relation at each end of each truck element, and each pair of such boxes serves to support a stub axle 11 on which a wheel is rotatably mounted. Each wheel is accommodated in bifurcations 12 in the plating 5 and 6 and includes a tread surface 13, the usual flange 14 and laterally disposed brake ring portions 15.

The brake ring portions 15 are opposed by arcuate brake shoes 16 controlled by suitable actuator devices generally designated 17 and to which movement can be applied by application of fluid pressure, through the brake cylinder equipments generally designated 18 under automatic torque control through the medium of pressure control devices generally designated 19, or manually through suitable tackle generally designated 20. It is to be understood that the specific construction of the wheels, of the brake equipment, and of the brake equipment controlling devices forms no part of the present invention, and further detailed description thereof herein is deemed unnecessary.

Each truck element also includes central cradle plating 21 and well plating 22 spaced in the fore and aft direction with respect to the geometrical vertical center of the truck element and tilted upwardly and inwardly in a manner for forming a gimbal well having enlargements or clearances in the bottom and in the fore and aft direction, as is best shown in Figure 3 of the drawings.

The well 23 accommodates the positioning of a gimbal structure composed of an outer shell or sleeve 24 and an inner shell or sleeve 25 concentric with and spaced a considerable distance inwardly of the outer sleeve. The sleeves 24 and 25 are separated by a live rubber cushion or sleeve 26 which is interposed between and vulcanized to said sleeves. This rubber sleeve allows the inner sleeve 25 to partake of a considerable amount of vertical and lateral movement within the outer sleeve 24.

The outer sleeve 24 is mounted on a support ring 27 which is secured on and extends upwardly from a supporting plate 28 which is flat in transverse cross section, as illustrated in Figure 4 of the drawings, and arcuate in longitudinal cross section to conform to the curvature of the central portion of the cradle plating 21, as illustrated in Figures 2 and 3 of the drawings. The plate 28 includes upstanding laterally presented edge portions 29 which straddle a part of the ring 27 and oppose the upturned side flange portions 30 of a rubber mat 31 which is interposed between the plate 28 and the cradle plating 21. The rubber mat 31 may be vulcanized to the plate 28 but is capable of slippage on the cradle plating 21 during movement of the truck elements over rough road beds.

The inner sleeve 25 has a bottom portion 32 spaced as at 33 above the plate 28 so that the inner sleeve 25 is free to move up and down within the outer sleeve 24 and on the rubber sleeve mounting 26. It will be noted, however, that the spacing 33 is slight, and the bottom 32 may contact the plate 28 as a result of heavy road shocks incident to travel over rough road beds or in case of fatigue of the resilient supporting sleeve 26.

The bottom 32 includes a center boss 34 which is surrounded by a spring thrust ring 35 and a slip ring 36 underlying the thrust ring. A king post sleeve 37 is telescopically mounted in the inner sleeve 25 and extends upwardly through the well 23 and through an annular gland 38 weld-secured to the sleeve 25 and having a U-shaped fluid pressure sealing gasket 39 seated therein. Each king post also includes an abutment partition 40 opposed by a cup ring 41, and an equipment of nested compression springs 42 is interposed between each cup ring 41 and the underlying thrust ring 35.

An annular grooved mounting ring 43 is carried by each truck element top plating 5 in position for surrounding the respective king post well 23, and this ring is encircled by a flexible dust guard 44 which grips the king post sleeve 37 as at 45. The king post sleeves 37 of each complementary pair of truck elements or units are secured as at 46 to a cross bolster 47 which may comprise a cylindrical body formed of flange-secured half portions. The cross bolsters serve to secure complementary pairs of truck elements in generally parallel spaced relation, and the bolsters of each car are secured in longitudinally spaced relation by a suitable center beam structure 48 which is mounted upon and secured in any approved manner to the bolsters in the manner illustrated in Figures 1 and 2 of the drawings.

If desired, each truck element may be reinforced at each side of its king post equipment by suitable vertically disposed gusset elements 49.

A tie bar is connected across the truck elements toward the end of each complementary pair thereof. Each tie bar preferably comprises an inverted channel member 50 which is pivotally connected as at 51 to each truck unit or element of a complementary pair of truck elements at a point outside the track gage line in the manner illustrated in Figures 1 and 2 of the drawings. The tie bar members thus connected across between the truck elements cause said elements to move in unison. The tandem mounted wheels of the complementary truck elements are held to gage by the tie bars 50, and any time that a vertical plane passing through the centers of the king posts is not normal to the track at that point (normal meaning perpendicular to the tangent) the effective gage of the wheels is reduced, causing the wheel gage to be narrower than the track gage, and thus producing a fore-shortening effect. The tie bars being anchored to the truck frames at points outside of the track gage lines will force the truck elements outwardly when rounding curves and tend to compensate for this fore-shortening, or in other words, tend to cause the wheel gage lines to coincide with the track gage lines in the rounding of the curves. The resilient mounting of the gimbal elements will permit the necessary spreading of the truck elements.

The weight of the car or vehicle body tends to shear the rubber supporting and cushioning sleeve 26 because of its being vulcanized to the gimbal sleeves 24 and 25, permitting the inner cylinder 25 to travel downwardly under the load. Under extreme shocks, or in case of fatigue of the rubber of the sleeve 26, the bottom 32 of the inner gimbal sleeve 25 may contact and rest on the cushioned plate 28. The close spaced relation between the parts 32 and 28 thus provides for the desired freedom of movement of the sleeve 25 and yet serves to protect the rubber sleeve 26 and act as a safety in case of failure of said rubber sleeve.

As has been described, the rubber sleeve 26 functions in series with, or is augmented by the metallic coil spring equipments 42. However, the metallic coil springs 42 may be eliminated if desired when the equipment is to be operated over comparatively smooth trackage or when the space between the gimbal cylinders 24 and 25 enables the provision of a rubber sleeve 26 thick enough to produce the required load supporting spring action.

The additional flanged rubber mat 30, 31 accommodates the continual oscillation of the truck elements or units about horizontal transverse axes and permits rocking to accommodate the slight vertical oscillation of the wheels over comparatively smooth trackage. As has been stated, this rubber mat equipment is vulcanized to the plate 28 but may slip in the truck pocket seat formed in the cradle plating 21. The lateral flanges 30 of this mat equipment are compressible to permit slight lateral movements of the truck elements so that the wheel flanges may move laterally to accommodate imperfect alignment of trackage without imparting lateral shock to the car body. The shearing action of the rubber in the mat 30, 31 will tend to accommodate this slight lateral movement without slippage of the mat on the cradle plating 21 but under extreme rocking of the truck unit the slippage referred to will take place.

Another property of this rubber mat equipment 30, 31 is to permit a slight tilting of the truck unit and wheels to cushion the reaction of the wheel flanges against the rails so that the mass of the body of the vehicle may travel smoothly in a straight line while the flanges are following lateral imperfections in the trackage. This action also saves considerable shock to the body of the vehicle when passing through frogs and switches and when a wheel strikes a guard rail such as are usually located opposite the frogs, and on sharp radius curves.

The U-shaped sealing gasket 39 interposed between the king post sleeve 37 and the inner gimbal sleeve 25 serves a two-fold purpose. First, it provides a method of retaining fluid pressure in the compartment in which the spring equipment 42 is mounted, thereby enabling said pressure to cushion the telescoping of the sleeve structures and provide for easy riding of the vehicle; and secondly, it serves to prevent the oil which lubricates the outer wall of the king post 37 from creeping over and contacting the rubber sleeve and mat equipments.

The rubber dust guard 44 which is clamped to the king post 37 and the mounting ring 43 associated therewith serves to prevent dust and foreign particles from entering the truck unit gimbal well and the parts contained therein. This rubber guard also provides for sufficient flexibility to accommodate the motions of the truck units relative to the king post. The braking equipments herein generally disclosed are specifically claimed in my co-pending application for United States Letters Patent filed May 20, 1939, and identified by Serial Number 274,849.

The tie bar or truck unit connecting structure herein generally disclosed is claimed in my co-pending application for United States Letters Patent filed May 20, 1939, and identified by Serial Number 274,846.

It is of course to be understood that the details of structure and arrangement of parts may be variously changed and modified without departing from the spirit and scope of my invention.

I claim:

1. In a truck structure for track travelling vehicles, a bolster, a large diameter hollow king post depending from said bolster, a truck unit frame having a pair of wheels rotatably supported thereon in tandem relation and a well portion surrounding said post, a gimbal structure including an inner load supporting sleeve in which said post is oscillatably and telescopically mounted and an outer sleeve supported in said well portion and telescopically surrounding said inner sleeve, means within said post for yieldably resisting telescoping of the post in said inner sleeve, and a live rubber sleeve interposed between and vulcanized to both said sleeves so as to yieldably resist movement of the inner sleeve downwardly in said outer sleeve.

2. In a truck structure for track travelling vehicles, a bolster, a large diameter hollow king post depending from said bolster, a truck unit frame having a pair of wheels rotatably supported thereon in tandem relation and a well portion surrounding said post, a gimbal structure including an inner load supporting sleeve in which said post is oscillatably and telescopically mounted and an outer sleeve supported in said well portion and telescopically surrounding said inner sleeve, means within said post for yieldably resisting telescoping of the post in said inner sleeve, a live rubber sleeve interposed between and vulcanized to both said sleeves so as to yieldably resist movement of the inner sleeve downwardly in said outer sleeve, and yieldable means disposed beneath and supporting said outer sleeve in said well portion.

3. In a truck structure for track travelling vehicles, a bolster, a large diameter hollow king post rigidly depending from said bolster, a truck unit frame having a pair of wheels rotatably supported thereon in tandem relation and a well portion surrounding said post, a gimbal structure including an inner load supporting sleeve in which said post is oscillatably and telescopically mounted and an outer sleeve supported in said well portion and telescopically surrounding said inner sleeve, means opposing downward telescopic movement of said king post in said inner sleeve, a live rubber sleeve interposed between and vulcanized to both said sleeves so as to yieldably resist movement of the inner sleeve downwardly in said outer sleeve, said outer sleeve having a bottom and said bottom and said well portion having opposed curved surfaces relatively slidable to permit rocking of the frame in the direction or plane of travel, and said inner sleeve having a bottom spaced slightly above said outer sleeve bottom.

4. In a truck structure for track travelling vehicles, a bolster, a large diameter hollow king post rigidly depending from said bolster, a truck unit frame having a pair of wheels rotatably supported thereon in tandem relation and a well portion surrounding said post, a gimbal structure including an inner load supporting sleeve in which said post is oscillatably and telescopically mounted and an outer sleeve supported in said well portion and telescopically surrounding said inner sleeve, means opposing downward telescopic movement of said king post in said inner sleeve, a live rubber sleeve interposed between and vulcanized to both said sleeves so as to yieldably resist movement of the inner sleeve downwardly in said outer sleeve, said outer sleeve having a bottom, said inner sleeve having a bottom spaced slightly above said outer sleeve bottom, said well portion having a curved cradle bottom, and said outer sleeve bottom being flat in transverse cross section and curved longitudinally to conform to and slide in said cradle bottom to permit fore and aft rocking of the frame.

5. In a truck structure for track travelling vehicles, a bolster, a king post depending from said bolster, a truck unit frame having a pair of wheels rotatably supported thereon in tandem relation and a well portion surrounding said post, a gimbal structure including an inner load supporting sleeve in which said post is oscillatably mounted and an outer sleeve supported in said well portion and telescopically surrounding said inner sleeve, a live rubber sleeve interposed between and vulcanized to both said sleeves so as to yieldably resist movement of the inner sleeve downwardly in said outer sleeve, said outer sleeve having a bottom and said bottom and said well portion having opposed curved surfaces relatively slidable to permit rocking of the frame in the direction or plane of travel, said inner sleeve having a bottom spaced slightly above said outer sleeve bottom, and a rubber mat vulcanized to said outer sleeve bottom and yieldably spacing said outer bottom from the curved surface of said well portion.

6. In a truck structure for track travelling vehicles, a bolster, a king post depending from said bolster, a truck unit frame having a pair of wheels rotatably supported thereon in tandem relation and a well portion surrounding said post, a gimbal structure including an inner load supporting sleeve in which said post is oscillatably mounted and an outer sleeve supported in said well portion and telescopically surrounding said inner sleeve, a live rubber sleeve interposed between and vulcanized to both said sleeves so as to yieldably resist movement of the inner sleeve downwardly in said outer sleeve, said outer sleeve having a bottom, said inner sleeve having a bottom spaced slightly above said outer sleeve bottom, said well portion having a curved cradle bottom, said outer sleeve bottom being flat in transverse cross section and curved longitudinally to conform to and slide in said cradle bottom to permit fore and aft rocking of the frame, and a rubber mat vulcanized to said outer sleeve bottom and yieldably spacing said outer sleeve bottom and said well portion curved cradle bottom.

7. In a truck structure for track travelling vehicles, a bolster, a king post depending from said bolster, a truck unit frame having a pair of wheels rotatably supported thereon in tandem relation and a well portion surrounding said post, a gimbal structure including an inner load supporting sleeve in which said post is oscillatably mounted and an outer sleeve supported in said well portion and telescopically surrounding said inner sleeve, a live rubber sleeve interposed between and vulcanized to both said sleeves so as to yieldably resist movement of the inner sleeve downwardly in said outer sleeve, said outer sleeve having a bottom, said inner sleeve having a bottom spaced slightly above said outer sleeve bottom, said well portion having a curved cradle bottom, said outer sleeve bottom being flat in transverse cross section and curved longitudinally to conform to and slide in said cradle bottom to permit fore and aft rocking of the frame, said post having an abutment means therein and being telescopically received in said inner sleeve, means interposed between the abutment means and the inner sleeve bottom for yieldably resisting downward movement of said post, and a rubber mat vulcanized to said outer sleeve bottom and yieldably spacing said outer sleeve and said outer sleeve bottom vertically and laterally in said well portion curved cradle bottom.

8. In a truck structure for track travelling vehicles, a bolster, a king post depending from said bolster, a truck unit frame having a pair of wheels rotatably supported thereon in tandem relation and a well portion surrounding said post, a gimbal structure including an inner load supporting sleeve in which said post is oscillatably mounted and an outer sleeve supported in said well portion and telescopically surrounding said inner sleeve, a live rubber sleeve interposed between and vulcanized to both said sleeves so as to yieldably resist movement of the inner sleeve downwardly in said outer sleeve, and sealing means carried by said inner sleeve and engaging said post above the rubber sleeve for preventing oozing of lubricant onto said rubber sleeve.

HENRY FORT FLOWERS.